US010439920B2

(12) United States Patent
McCallen et al.

(10) Patent No.: US 10,439,920 B2
(45) Date of Patent: Oct. 8, 2019

(54) NETWORK PERFORMANCE MONITORING

(71) Applicant: Viavi Solutions Inc., Milpitas, CA (US)

(72) Inventors: Michael McCallen, Ottawa (CA); Joseph Haver, Colorado Springs, CO (US); Timothy Warland, Ottawa (CA)

(73) Assignee: VIAVI Solutions Inc., San Jose, CA (US)

(*) Notice: Subject to any disclaimer, the term of this patent is extended or adjusted under 35 U.S.C. 154(b) by 330 days.

(21) Appl. No.: 15/362,222

(22) Filed: Nov. 28, 2016

(65) Prior Publication Data

US 2018/0152369 A1 May 31, 2018

(51) Int. Cl.
H04L 12/26 (2006.01)
(52) U.S. Cl.
CPC .............. H04L 43/12 (2013.01); H04L 43/06 (2013.01); H04L 43/0829 (2013.01); H04L 43/0852 (2013.01)
(58) Field of Classification Search
CPC ..... H04L 43/12; H04L 43/06; H04L 43/0829; H04L 43/0852
See application file for complete search history.

(56) References Cited

U.S. PATENT DOCUMENTS

| 2014/0029441 | A1* | 1/2014 | Nydell | H04L 43/0864 370/241.1 |
| 2014/0169183 | A1* | 6/2014 | Allan | H04L 43/10 370/248 |
| 2014/0211636 | A1* | 7/2014 | Robitaille | H04L 43/0829 370/241.1 |
| 2016/0028603 | A1* | 1/2016 | Chakrabarti | H04L 43/0852 370/252 |
| 2016/0352865 | A1* | 12/2016 | Gupta | H04L 67/42 |

OTHER PUBLICATIONS

K. Hedayat et al., "A Two-Way Active Measurement Protocol (TWAMP)," https://tools.ietf.org/html/rfc5357, Oct. 2008, 27 pages.

* cited by examiner

Primary Examiner — Wing F Chan
Assistant Examiner — Billy H Ng
(74) Attorney, Agent, or Firm — Harrity & Harrity, LLP

(57) ABSTRACT

A network device may include one or more processors configured to receive a measurement message en route to a destination via a network, where the measurement message includes a test packet of a two-way active measurement protocol (TWAMP) session. The network device may determine information based on the measurement message. The information may include a timestamp identifying a time associated with the measurement message, and may identify the measurement message. The network device may store or provide the information for determination of network performance information regarding the network device. The network device may transmit the measurement message toward the destination.

20 Claims, 9 Drawing Sheets

NETWORK PERFORMANCE MONITORING

BACKGROUND

Network services may be provided via a network. For example, a network service may be provided from a first endpoint device to a second endpoint device via a set of network devices (e.g., on a route between the first endpoint device and the second endpoint device). A portion of a route associated with a particular network device may be referred to as a segment. For example, a segment for a particular network device may include the particular network device and a hop or link preceding and/or following the particular network device on the route.

SUMMARY

A network device may include one or more processors configured to receive a measurement message en route to a destination via a network, where the measurement message includes a test packet of a two-way active measurement protocol (TWAMP) session. The network device may determine information based on the measurement message. The information may include a timestamp identifying a time associated with the measurement message, and may identify the measurement message. The network device may store or provide the information for determination of network performance information regarding the network device. The network device may transmit the measurement message toward the destination.

A non-transitory computer-readable medium may store one or more instructions that, when executed by one or more processors of a device, cause the one or more processors to receive a measurement message en route to a destination. The measurement message may include a test packet of a two-way active measurement protocol (TWAMP) session. The one or more instructions, when executed by the one or more processors, may cause the one or more processors to determine segment information based on receiving the measurement message. The segment information may include a timestamp associated with the measurement message. The timestamp may identify a time at which the measurement message is received or transmitted by the device. The segment information may identify the measurement message. The one or more instructions, when executed by the one or more processors, may cause the one or more processors to store or provide the segment information for determination of network performance information regarding the device. The one or more instructions, when executed by the one or more processors, may cause the one or more processors to transmit the measurement message toward the destination.

A method for configuring a network may include receiving, by a device, segment information associated with a plurality of network devices. The segment information may be generated based on transmission of a single measurement message received by each network device of the plurality of network devices. The single measurement message may include a test packet of a two-way active measurement protocol (TWAMP) session. The segment information may identify times at which each network device received or transmitted the single measurement message. At least one network device, of the plurality of network devices, may not be an endpoint device of the TWAMP session. The method may include determining, by the device, network performance information relating to performance of the plurality of network devices based on the segment information. The method may include performing, by the device, an action based on the network performance information.

DETAILED DESCRIPTION

Figure 1A:
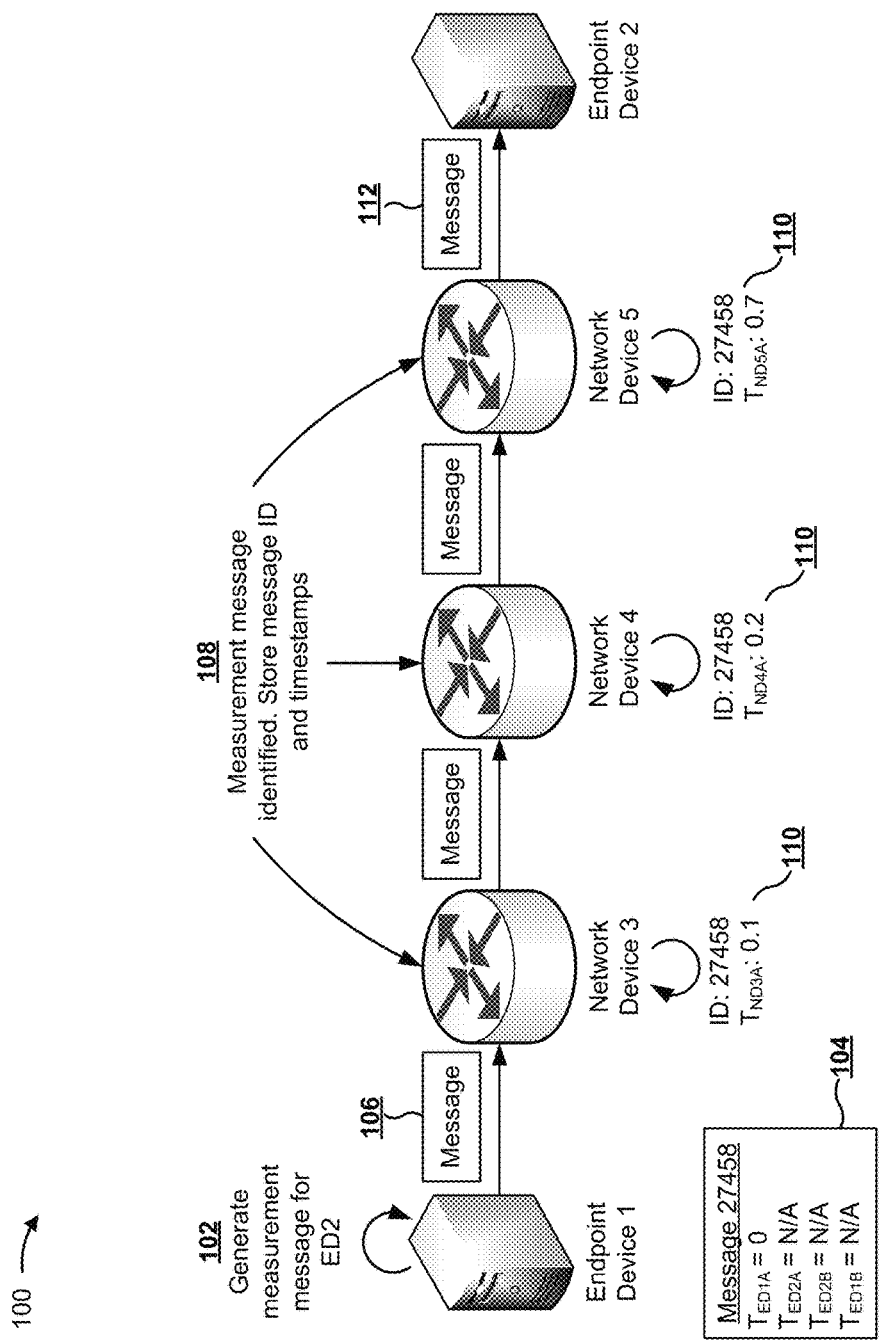
FIGS. 1A-1C are diagrams of an overview of an example implementation described herein.

The following detailed description of example implementations refers to the accompanying drawings. The same reference numbers in different drawings may identify the same or similar elements.

A network may include network devices that carry network traffic between endpoint devices. It may be useful to monitor performance of the network devices (e.g., based on latency, delay, throughput, jitter, loss, etc.). One method of monitoring network performance is the Two-Way Active Measurement Protocol (TWAMP). The TWAMP is an open protocol for measuring network performance between any two devices supporting TWAMP.

When performing network testing based on the TWAMP, a first endpoint device transmits a two-way measurement message (e.g., a test packet or a session transmitter message) to a second endpoint device (e.g., via a TWAMP session configured between the first endpoint device and the second input device). The measurement message may include a first timestamp identifying a time at which the measurement message was transmitted by the first endpoint device. The second endpoint device receives the measurement message, and may add a second timestamp and a third timestamp to the measurement message (e.g., identifying a time at which the second endpoint device receives the measurement message, and a time at which the second endpoint device transmits the measurement message back to the first endpoint device, respectively). The second endpoint device transmits the measurement message, as a session reflector message, back to the first endpoint device (or a network management device) so that the first endpoint device can analyze network performance of the path between the first endpoint device and the second endpoint device based on the timestamps. In some implementations, the first endpoint device may add a fourth timestamp to the measurement message identifying a time at which the first endpoint device received the measurement message.

Additionally, or alternatively, the measurement message may include a sequence number. For example, when performing an active performance management process, the first endpoint device may generate multiple measurement messages that are associated with respective sequence numbers. The first endpoint device may receive the measurement messages from the second endpoint device upon transmission from the second endpoint device, and may determine network performance information based on the respective sequence numbers. For example, the first endpoint device may identify dropped measurement messages, out-of-sequence measurement messages, or the like.

In some cases, TWAMP may provide measurement information regarding only the pair of endpoint devices. For example, when network traffic is routed via interim network devices, TWAMP does not provide information regarding the interim network devices (e.g., timestamps associated with times of receipt or transmission of the measurement message by the interim network devices). To determine measurement information for multiple network segments between the endpoint devices using TWAMP, it may be necessary to configure TWAMP test sessions between the network devices associated with each of the multiple network segments. This may be time consuming and resource intensive. Also, performing multiple, different tests over a length of time does not provide information regarding a particular network traffic flow or test packet. For example, network conditions may change between tests, thereby reducing the validity of the test results. This may be exacerbated in shared transport situations, where allotted bandwidth and network resources can rapidly change over time.

In implementations described herein, network devices on a monitored path between a pair of endpoint devices (i.e., a first endpoint device and a second endpoint device) detect measurement messages and store or provide segment information associated with the measurement messages to determine network performance information. For example, for a given two-way measurement message, each network device on the monitored path may store or provide a timestamp upon receiving and/or transmitting the measurement message. For example, each network device may store information identifying a time at which the measurement message is received en route from the first endpoint device to the second endpoint device, and a time at which the measurement message is received by each network device after reflection from the second endpoint device. In some implementations, each network device on the monitored path may generate respective segment information. In other words, the segment information need not be generated by an endpoint device or network device based on the timestamps, and may be generated by the network devices.

In this way, implementations described herein permit identification of segment information for each network device on a monitored path, and conserve processor and network resources that would otherwise be used to configure and perform multiple measurement processes or sessions. Additionally, implementations described herein determine segment information at each hop or segment of the monitored path based on a single packet or network traffic flow. Determining segment information based on a single packet or network traffic flow provides more useful measurement information than performing such determinations based on multiple, different packets or network traffic flows. This segment information can also be used to reconfigure the network devices and/or endpoint devices, thus improving network performance.

While implementations described herein are sometimes described in the context of the TWAMP, implementations described herein need not be limited to the TWAMP. Indeed, implementations described herein can be applied with regard to any active performance monitoring protocol.

Figure 1B:
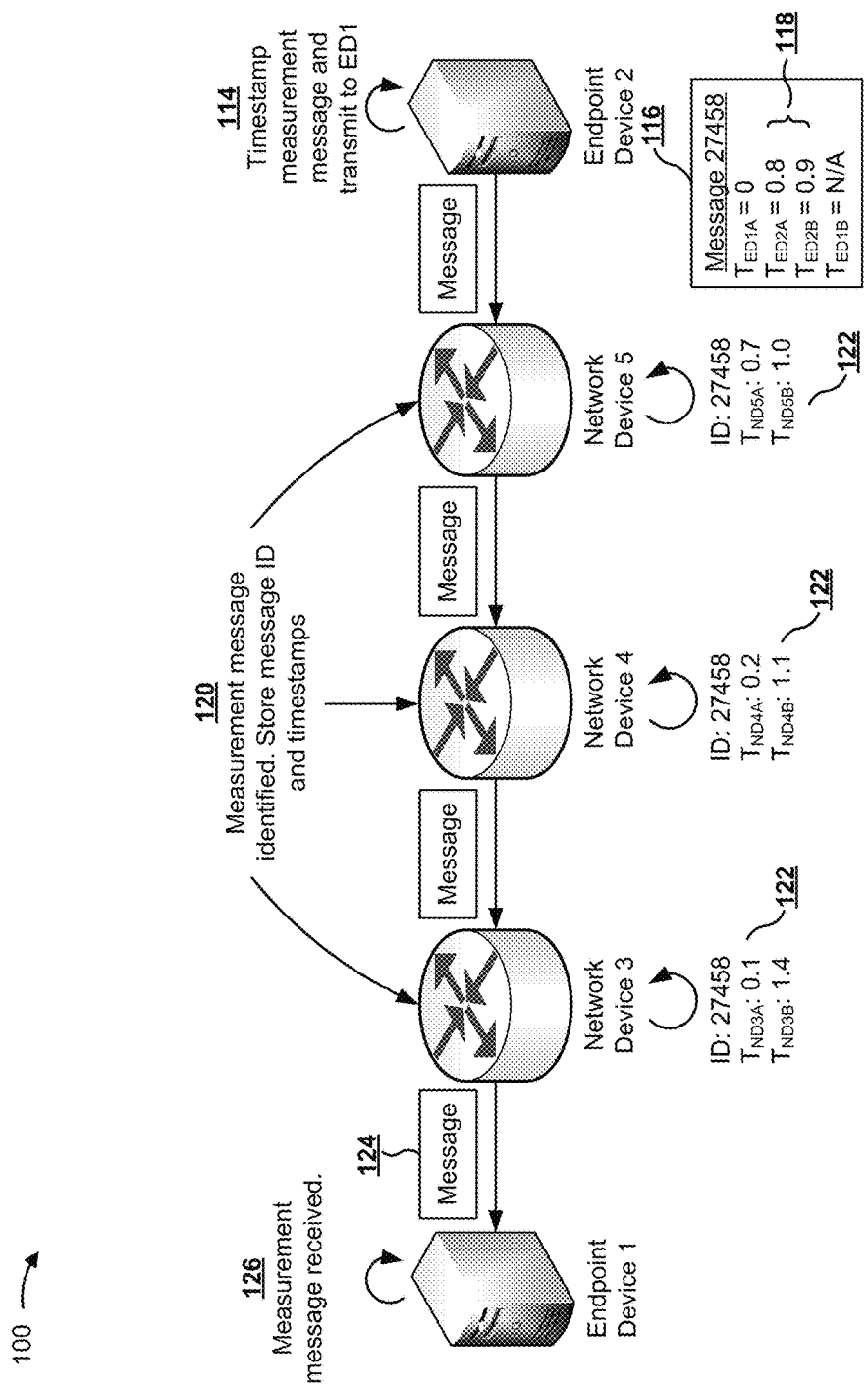
Figure 1C:
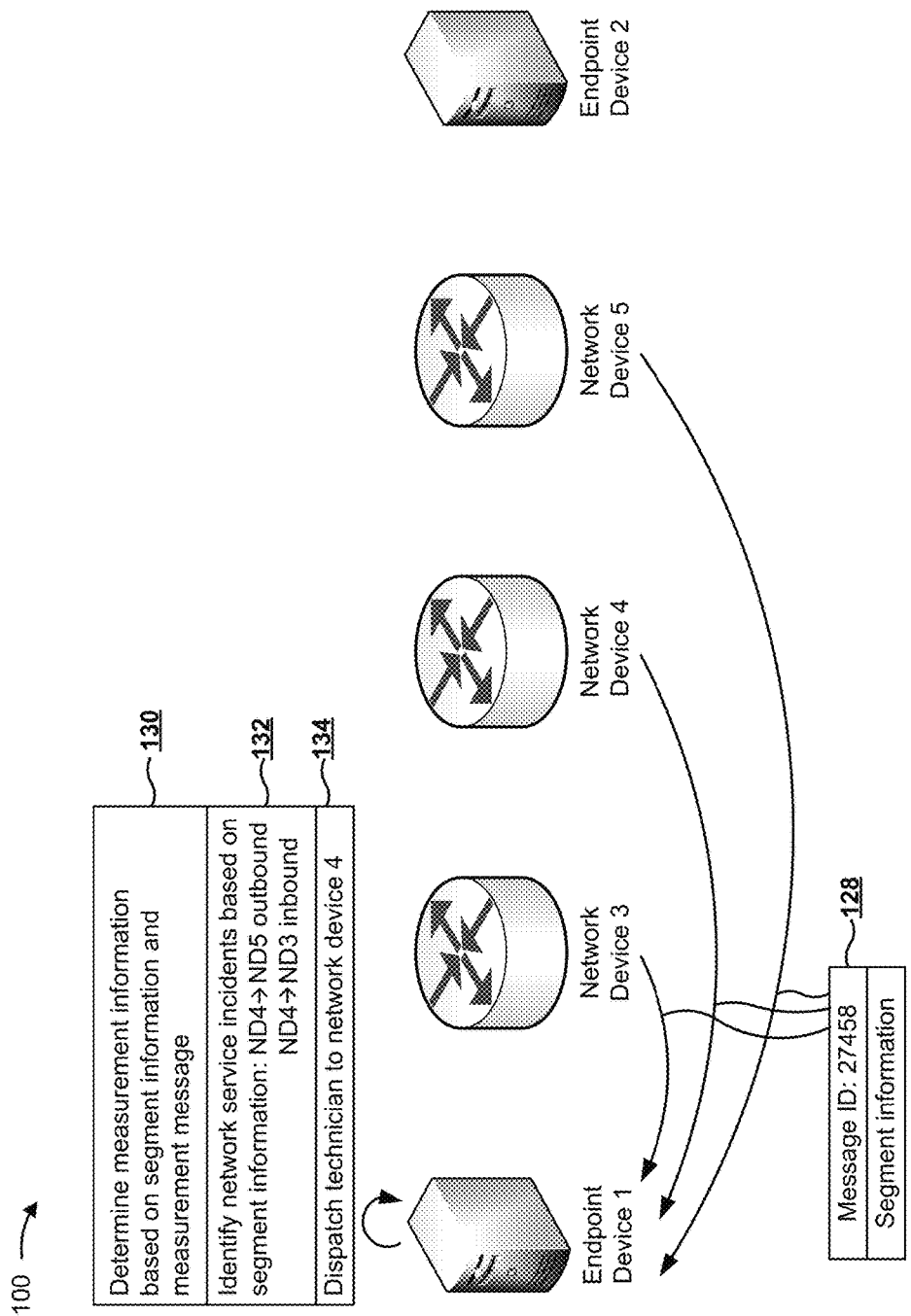

FIGS. 1A-1C are diagrams of an overview of an example implementation 100 described herein. Example implementation 100 includes a first endpoint device (e.g., endpoint device 1), a second endpoint device (e.g., endpoint device 2), a first network device (e.g., network device 3), a second network device (e.g., network device 4), and a third network device (e.g., network device 5). Assume that network devices 3, 4, and 5 are associated with a monitored path between endpoint devices 1 and 2. Endpoint devices 1 and 2 correspond to endpoint device 210 described in connection with FIG. 2, and network devices 3, 4, and 5 correspond to network device 220 described in connection with FIG. 2.

As shown in example implementation 100, network device 3, network device 4, and network device 5 each receives a measurement message en route to a destination (endpoint device 2), and en route from endpoint device 2 to endpoint device 1. As further shown, each network device determines segment information based on the measurement message. The segment information may include a timestamp associated with the measurement message, and may identify the measurement message. The network devices may store or provide the segment information to an endpoint device and/or a network management device. In some implementations, the measurement message may include a sequence identifier that identifies a relative position of the measurement message in a sequence of multiple measurement messages, which permits identification of out-of-order measurement messages, dropped measurement messages, or the like.

As shown in FIG. 1A, and by reference number 102, endpoint device 1 generates a measurement message to be routed to endpoint device 2. As shown by reference number 104, the measurement message includes a message identifier of 27458. Also as shown by reference number 104, measurement message 27458 includes timestamps of $T_{ED1A}$, $T_{ED2A}$, $T_{ED2B}$, and $T_{ED1B}$. $T_{ED1A}$ may correspond to a time at which endpoint device 1 transmits the measurement message. $T_{ED2A}$ may correspond to a time at which endpoint device 2 receives the measurement message. $T_{ED2B}$ may correspond to a time at which endpoint device 2 transmits or reflects the measurement message back toward endpoint device 1, and $T_{ED1B}$ may correspond to a time at which endpoint device 1 receives the measurement message.

As further shown, endpoint device 1 transmits the measurement message at a time associated with a timestamp of 0 (e.g., $T_{ED1A}=0$) (e.g., in seconds, milliseconds, microseconds, or the like). As shown by reference number 106, endpoint device 1 transmits measurement message 27458 to network device 3. In some implementations, endpoint device 1 may add information identifying the timestamp of $T_{ED1A}$ to the measurement message.

As shown by reference number 108, network device 3, network device 4, and network device 5 identify measurement message 27458 (e.g., based on a header of the measurement message, based on the timestamps included in the measurement message, etc.). As further shown, network device 3, network device 4, and network device 5 may store the message identifier of 27458, and may store timestamps associated with measurement message 27458.

The stored timestamps may identify respective times at which network device 3, network device 4, and network device 5 transmit or receive measurement message 27458 to endpoint device 2. For example, the stored timestamps may include $T_{ND3A}$, $T_{ND4A}$, $T_{ND5A}$, $T_{ND3B}$, $T_{ND4B}$, and $T_{ND5B}$. $T_{ND3A}$, $T_{ND4A}$, and $T_{ND5A}$ may identify times at which network devices 3, 4, and 5 transmit or receive the measurement message en route from endpoint device 1 to endpoint device 2, and $T_{ND3B}$, $T_{ND4B}$, and $T_{ND5B}$ may identify times at which network devices 3, 4, and 5 transmit or receive the measurement message en route from endpoint device 2 to endpoint device 1.

As shown by reference number 110, the stored timestamps may indicate that network device 3 receives or transmits measurement message 27458 to network device 4 at time 0.1 (e.g., $T_{ND3A}$: 0.1), that network device 4 receives or transmits measurement message 27458 to network device 5 at time 0.2 (e.g., $T_{ND4A}$: 0.2), and that network device 5 receives or transmits measurement message 27458 to endpoint device 2 at time 0.7 (e.g., $T_{ND5A}$: 0.7). As shown by reference number 112, network device 5 transmits, and endpoint device 2 receives, the measurement message.

As shown in FIG. 1B, and by reference number 114, endpoint device 2 timestamps the received measurement message 27458 and transmits (e.g., reflects) the timestamped measurement message 27458 to endpoint device 1. As shown by reference number 116, the timestamps for measurement message 27458 indicate that endpoint device 1 transmitted measurement message 27458 to endpoint device 2 at time 0 (e.g., $T_{ED1A}=0$), that endpoint device 2 received measurement message 27458 from endpoint device 1 at time 0.8 (e.g., $T_{ED2A}=0.8$), endpoint device 2 transmitted measurement message 27458 toward endpoint device 1 at time 0.9 (e.g., $T_{ED2B}=0.9$), and endpoint device 1 has not yet received the measurement message 27458 (e.g., $T_{ED1B}=N/A$). As shown by reference number 118, $T_{ED2A}$ and $T_{ED2B}$ may be used based on TWAMP to identify a turnaround time at endpoint device 2 (e.g., a length of time between reception of the measurement message by endpoint device 2 and reflection of the measurement message by endpoint device 2). As further shown, network device 3, network device 4, and network device 5 receive measurement message 27458 transmitted from endpoint device 2 to endpoint device 1.

As shown by reference number 120, network device 3, network device 4, and network device 5 identify measurement message 27458. As further shown, network device 3, network device 4, and network device 5 store the message identifier of 27458 and timestamps associated with measurement message 27458. Network device 3, network device 4, and network device 5 then transmit measurement message 27458 back to endpoint device 2.

As shown by reference number 122, network device 5 transmits reflected measurement message 27458 to endpoint device 2 at time 1.0 (e.g., $T_{ND5B}$: 1.0), network device 4 transmits reflected measurement message 27458 to endpoint device 1 at time 1.1 (e.g., $T_{ND4B}$: 1.1), and network device 3 transmits reflected measurement message 27458 to endpoint device 1 at time 1.4 (e.g., $T_{ND3B}$: 1.4). For example, network devices 3, 4, and 5 may store information identifying the transmission times at which network devices 3, 4, and 5 transmitted the measurement message. In some implementations, network devices 3, 4, and 5 may store information identifying times at which network devices 3, 4, and 5 received the measurement message en route to endpoint device 1 (e.g., in addition to or as an alternative to the timestamps that identify transmission times). As shown by reference number 124, network device 1 transmits, and endpoint device 1 receives, measurement message 27458.

As shown by reference number 126, endpoint device 1 receives the measurement message 27458 and the timestamps associated with endpoint devices 1 and 2. In some implementations, endpoint device 1 may determine measurement information based on measurement message 27458. For example, endpoint device 1 may determine measurement information based on $T_{ED1A}$, $T_{ED2A}$, $T_{ED2B}$, and $T_{ED1B}$. In this way, endpoint devices 1 and 2 gather measurement information based on TWAMP. For the purpose of FIG. 1B, assume that endpoint device 1 has not received the segment information. For example, network devices 3, 4, and 5 may provide the segment information separately from the measurement message, as described in more detail in connection with FIG. 1C, below.

As shown in FIG. 1C, and by reference number 128, network device 3, network device 4, and network device 5 transmit, to endpoint device 1, segment information corresponding to network device 3, network device 3, and network device 5. In some implementations, a segment includes one or more network devices and/or a link between two or more network devices, where at least one of the network devices is configured to identify measurement information and collect the segment information accordingly.

In some implementations, network devices 3, 4, and 5 may transmit the segment information in association with the measurement message. For example, network devices 3, 4, and 5 may add the segment information to the measurement message, or may generate network traffic that identifies the segment information. Additionally, or alternatively, network devices 3, 4, and 5 may store the segment information, and may provide the segment information periodically, based on a request from endpoint device 1, or the like.

As shown by reference number 130, endpoint device 1 may determine measurement information based on the segment information and the measurement message (e.g., based on the timestamps associated with endpoint device 1, endpoint device 2, network device 3, network device 4, and network device 5). For example, the measurement information may indicate that endpoint device 1 transmitted measurement message 27458 toward network device 3 at time 0 (e.g., $T_{ED1A}=0$), that network device 3 transmitted measurement message 27458 toward network device 4 at time 0.1 (e.g., $T_{ND3A}$: 0.1), that network device 4 transmitted measurement message 27458 toward network device 5 at time 0.2 (e.g., $T_{ND4A}$: 0.2), and that network device 5 transmitted measurement message 27458 toward endpoint device 2 at time 0.7 (e.g., $T_{ND5A}$: 0.7).

The measurement information also may indicate that endpoint device 2 received measurement message 27458 from endpoint device 1 at time 0.8 (e.g., $T_{ED2A}$: 0.8), and that endpoint device 2 transmitted measurement message 27458 to network device 5 at time 0.9 (e.g., $T_{ED2B}$: 0.9). The measurement information further may indicate that network device 5 transmitted measurement message 27458 toward network device 4 at time 1.0 (e.g., $T_{ND5B}$: 1.0), that network device 4 transmitted measurement message 27458 toward network device 3 at time 1.1 (e.g., $T_{ND4B}$: 1.1), and that network device 3 transmitted measurement message 27458 toward endpoint device 1 at time 1.4 (e.g., $T_{ND3B}$: 1.4).

Based on the segment information and the measurement message, endpoint device 1 may determine network performance information identifying a latency of a particular segment, hop, or network device. Additionally, or alternatively, endpoint device 1 may identify a change in latency or throughput over time, may identify a particular network device that is associated with a high latency, may determine that a particular network device is associated with an unusually low throughput, or the like.

In some implementations, and as shown by reference number 132, based on the segment information, endpoint device 1 may identify network service incidents (e.g., a network service incident between network device 4 and network device 5 in an outbound direction from endpoint device 1 to endpoint device 2, and a network service incident between network device 4 and network device 3 in an inbound direction from endpoint device 2 to endpoint device 1). For example, endpoint device 1 may determine that the segments associated with the network service incidents are associated with higher latency than other segments of the monitored path, and may thereby identify the network service incidents. As shown by reference number 134, based on the network service incidents, endpoint device 1 causes a technician to be dispatched to network device 4.

In some implementations, endpoint device 1 may identify a network topology based on the segment information. For example, the segment information may include device information identifying network devices 3, 4, and/or 5. The device information may include, for example, a network address, a unique identifier, or the like. Endpoint device 1 may identify a network topology based on the device information. For example, endpoint device 1 may identify an outbound path and/or an inbound path associated with the measurement message. Additionally, or alternatively, endpoint device 1 may identify an inbound path that is different than an outbound path of the measurement message. For example, when the measurement message travels via one or more first network devices on an outbound path, and via one or more second network devices on an inbound path, endpoint device 1 may identify a network topology including the one or more first network devices and the one or more second network devices.

In some implementations, endpoint device 1 may identify packet loss based on a segment identifier associated with the measurement message. For example, endpoint device 1 may determine that one or more other measurement messages associated with the measurement message have been dropped (e.g., may determine a packet loss measurement). Based on identifying the packet loss, endpoint device 1 may identify a network service incident. For example, endpoint device 1 may determine that a service level agreement or a class of service requirement has not been satisfied based on the packet loss. In some implementations, endpoint device 1 may cause a technician to be dispatched based on the packet loss.

In this way, based on a particular measurement message or network monitoring flow, network device 3, network device 4, and network device 5 provide segment information permitting determination of network performance information for each segment of the monitored path between endpoint device 1 and endpoint device 2. Thus, processor and network resources are conserved that would otherwise be used to configure and perform multiple measurement processes. Additionally, performing measurements at each hop or segment of the path based on the single measurement message provides more useful measurement information than performing such determinations based on multiple, different packets or network traffic flows.

As indicated above, FIGS. 1A-1C are provided merely as an example. Other examples are possible and may differ from what was described with regard to FIGS. 1A-1C.

Figure 2:
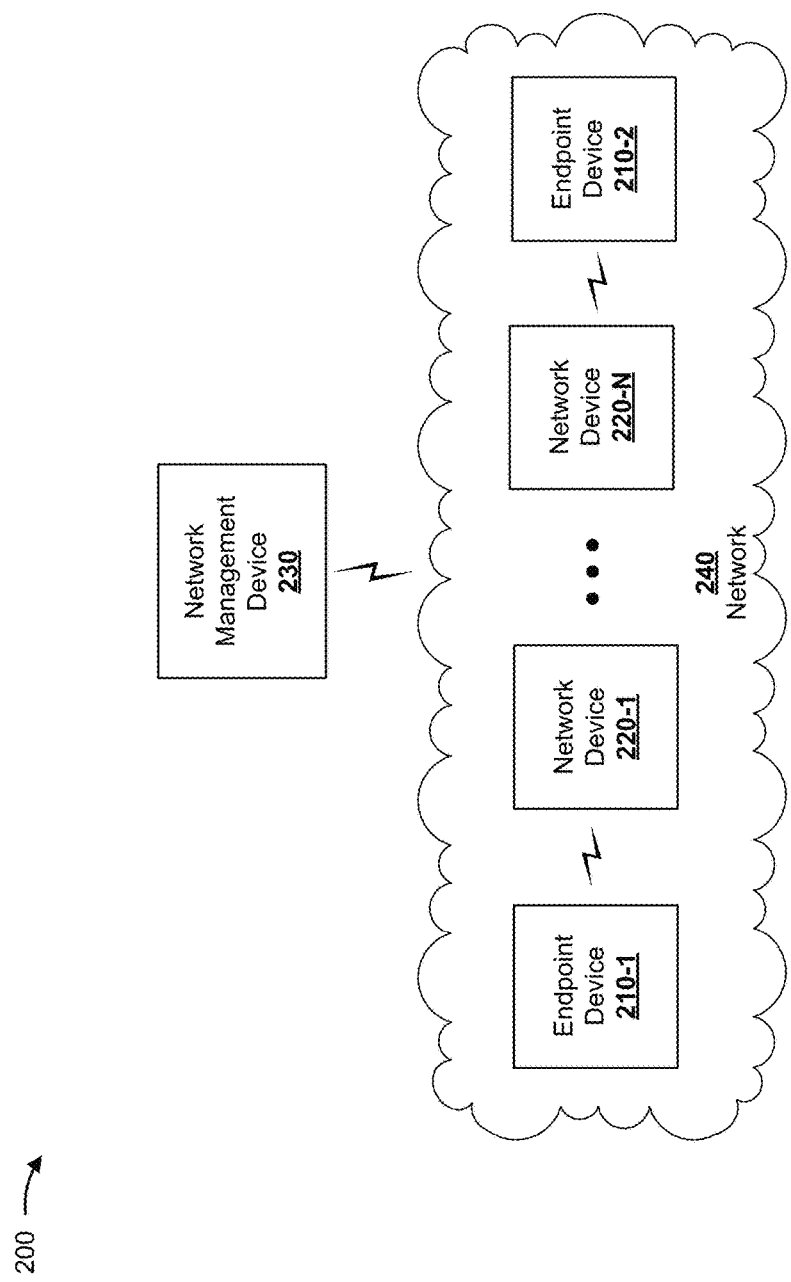
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include endpoint devices 210-1 and 210-2, one or more network devices 220-1 through 220-N(N≥1) (hereinafter referred to collectively as "network devices 220," and individually as "network device 220"), a network management device 230, and a network 240. Devices of environment 200 may interconnect via wired connections, wireless connections, or a combination of wired and wireless connections.

Endpoint device 210 includes one or more devices capable of receiving and/or providing information over a network (e.g., network 240), and/or capable of generating, storing, and/or processing information received and/or provided over the network. For example, endpoint device 210 may include a computing device, such as a laptop computer, a tablet computer, a handheld computer, a desktop computer, a mobile phone (e.g., a smart phone, a radiotelephone, etc.), a network device (e.g., a router, a gateway, a firewall, a hub, a bridge, a switch, etc.), a base station (e.g., an evolved node B, etc.), a radio head, a remote radio head, an edge device, or a similar device. Endpoint device 210 may act as an endpoint (e.g., a source and/or a destination) for a communication with another endpoint device 210. For example, a first endpoint device 210 may provide information to a second endpoint device 210 (e.g., via network device 220 and/or network 240).

Network device 220 includes one or more devices (e.g., one or more traffic transfer devices) capable of processing and/or transferring traffic between endpoint devices 210. For example, network device 220 may include a firewall, a router, a gateway, a switch, a hub, a bridge, a reverse proxy, a server (e.g., a proxy server), a security device, an intrusion detection device, a load balancer, a smart Small Form-factor Pluggable (SFP) device, a smart transceiver, a media converter, a packet broker, a tap, or a similar device.

Network management device 230 includes one or more devices capable of receiving, generating, storing, processing, and/or providing information, such as measurement information and/or information for reconfiguring endpoint device 210 and/or network device 220. For example, network management device 230 may include one or more computing devices, such as one or more server devices, desktop computers, workstation computers, virtual machines (VMs) provided in a cloud computing environment, a self-organizing network (SON) system, or similar devices. In some implementations, network management device 230 may be utilized by an entity that manages and/or operates one or more portions of environment 200, such as, for example, a telecommunication service provider, a television service provider, an Internet service provider, or the like. In some implementations, network management device 230 may be utilized by an entity that manages and/or operates a mobile network. In some implementations, network management device 230 may be centralized (e.g., in a backhaul network, etc.). Additionally, or alternatively, network management device 230 may be distributed (e.g., may be distributed over two or more endpoint devices 210, two or more network devices 220, etc.).

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
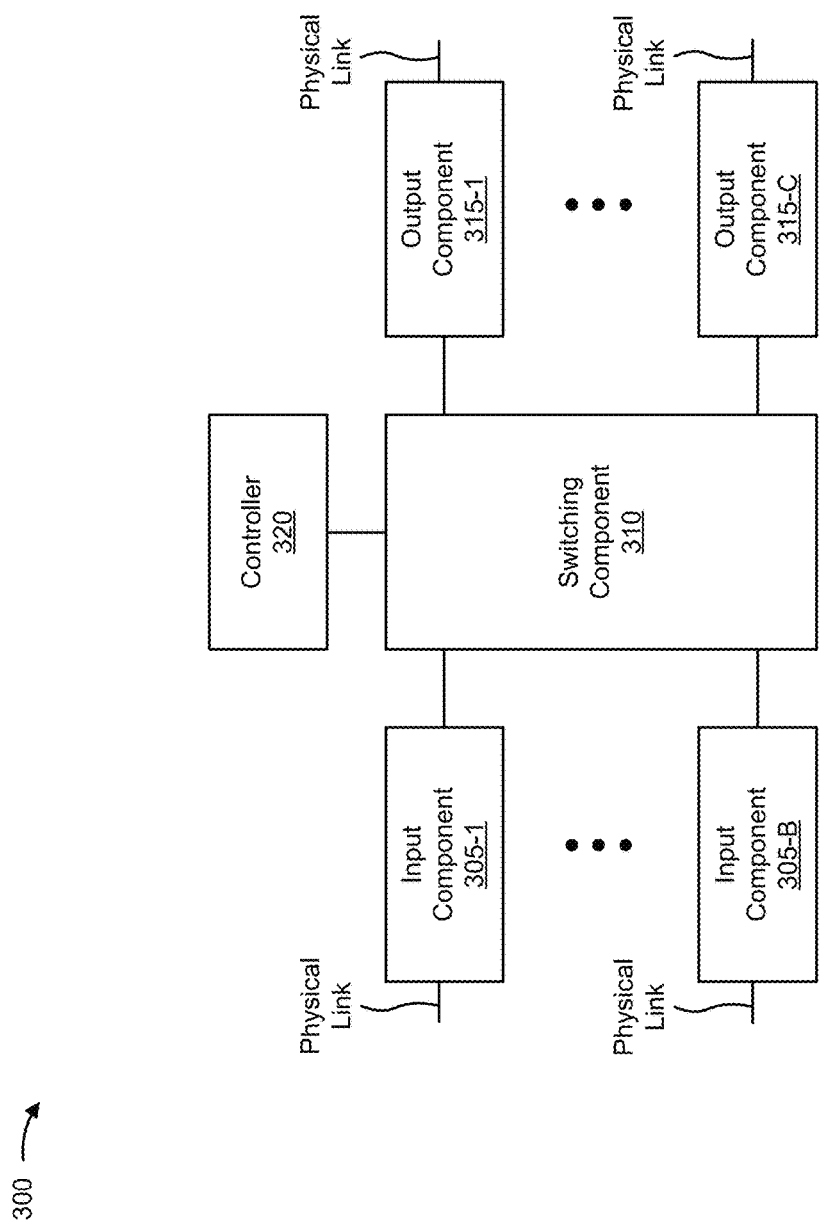
FIG. 3 is a diagram of example components of a network device of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets, frames, etc.) received by device 300. Input component 305 may process incoming traffic, such as by performing data link layer encapsulation or decapsulation. In some implementations, input component 305 may transmit and/or receive packets. As used herein, a packet may refer to a network packet, a frame, a datagram, a segment, a fragment of a network packet, a fragment of a frame, a fragment of a datagram, a fragment of a segment, or any other formatted or unformatted unit of data capable of being transmitted via a network. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may transmit packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
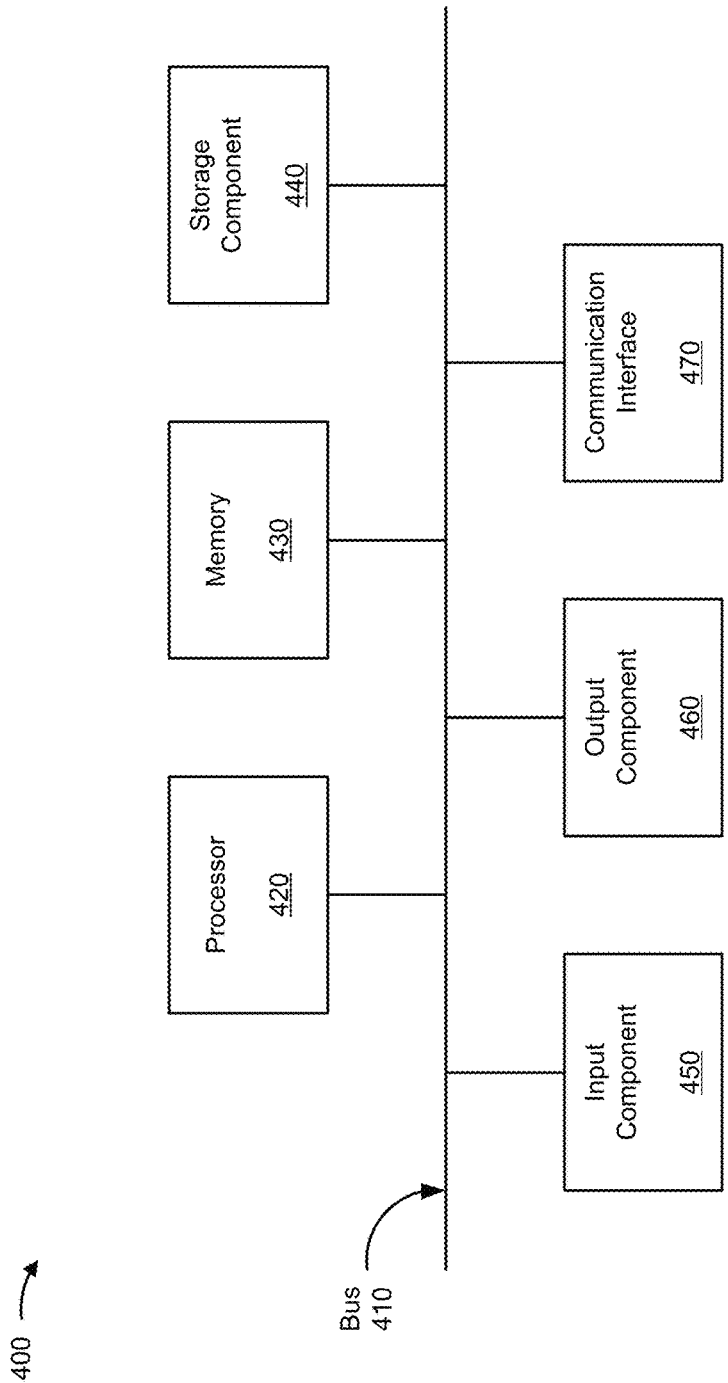
FIG. 4 is a diagram of example components of one or more devices of FIG. 2.

FIG. 4 is a diagram of example components of a device 400. Device 400 may correspond to endpoint device 210 and/or network management device 230. In some implementations, endpoint device 210 and/or network management device 230 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 is implemented in hardware, firmware, or a combination of hardware and software. Processor 420 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 420 may include one or more processors capable of being programmed to perform a function. Memory 430 may include a random access memory (RAM), a read only memory (ROM), and/or another type of dynamic or static storage device (e.g., a flash memory, a magnetic memory, an optical memory, etc.) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, etc.). Additionally, or alternatively, input component 450 may include a sensor for sensing information (e.g., a global positioning system (GPS) component, an accelerometer, a gyroscope, an actuator, etc.). Output component 460 may include a component that provides output information from device 400 (e.g., a display, a speaker, one or more light-emitting diodes (LEDs), etc.).

Communication interface 470 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
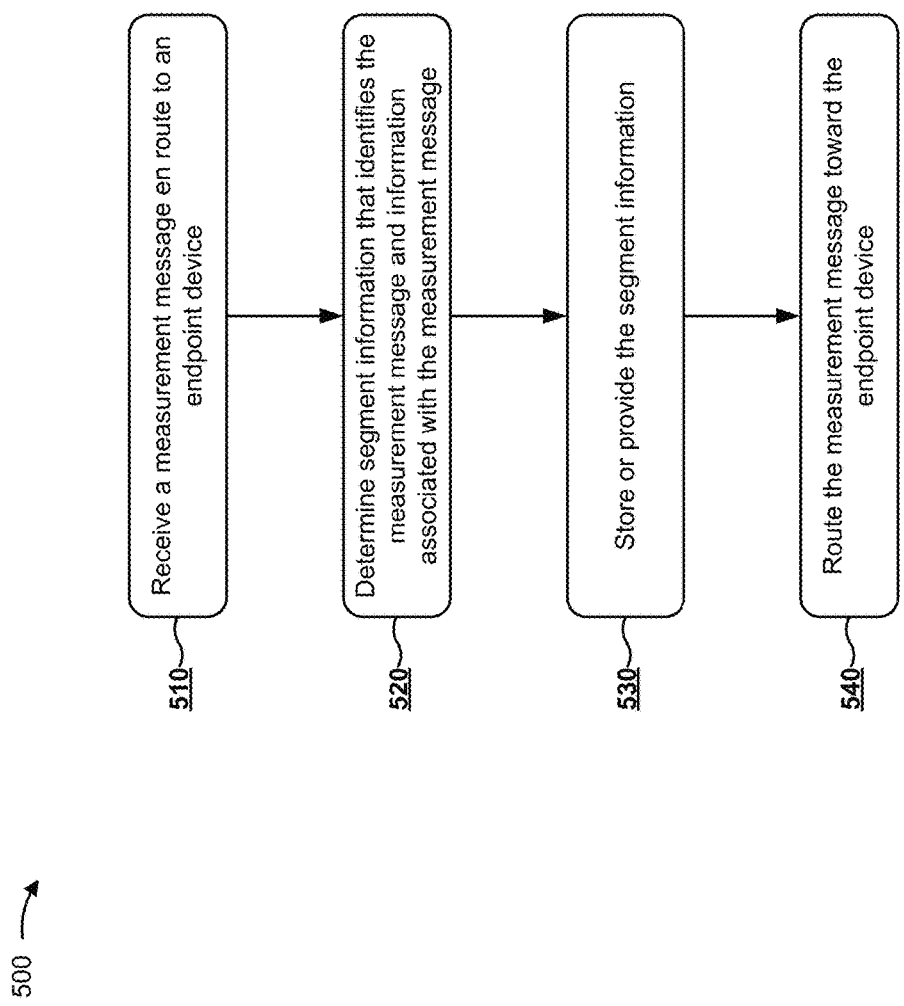
FIG. 5 is a flow chart of an example process for determining segment information based on a measurement message.

FIG. 5 is a flow chart of an example process 500 for determining segment information based on a measurement message. In some implementations, one or more process blocks of FIG. 5 may be performed by network device 220. In some implementations, one or more process blocks of FIG. 5 may be performed by another device or a group of devices separate from or including network device 220, such as endpoint device 210 and/or network management device 230.

As shown in FIG. 5, process 500 may include receiving a measurement message en route to an endpoint device (block 510). For example, network device 220 may receive a measurement message en route from endpoint device 210-1 to endpoint device 210-2. In some implementations, network device 220 may be associated with a monitored path. For example, one or more network devices 220 may provide the measurement message, such as a TWAMP test packet, from endpoint device 210-1 to endpoint device 210-2 on the monitored path. In some implementations, the measurement message may be en route from endpoint device 210-2 to endpoint device 210-1. For example, the measurement message may include a TWAMP test packet that has been reflected or transmitted from endpoint device 210-2 back toward endpoint device 210-1.

In some implementations, network device 220 may identify the measurement message based on a message type of the measurement message. For example, a header associated with the measurement message may identify the measurement message as a measurement message. Additionally, or alternatively, network device 220 may identify the measurement message based on a protocol identifier, a tag, a flag, a type field, a port number, or the like. Additionally, or alternatively, the measurement message may include information identifying the message as a one-way active measurement protocol (OWAMP) test packet, a TWAMP test packet, or the like.

In some implementations, network device 220 may identify the measurement message based on deep packet inspection. For example, information that identifies the message as a measurement message may be included in a payload of the measurement message (e.g., timestamps, etc.). As another example, network device 220 may receive information indicating that packets associated with particular information in the payloads of the packets are to be used as measurement messages, and may perform deep packet inspection to identify packets that are associated with the particular information. By performing deep packet inspection, network device 220 permits identification of measurement messages based on payloads of the measurement messages, which improves versatility of the monitoring process and improves network performance.

In some implementations, a measurement message may be associated with a particular service. For example, the measurement message may include a class of service (CoS) identifier, a Differentiated Services Code Point (DSCP) identifier, or the like. In some implementations, endpoint device 210-1 may generate the measurement message to test a particular service or CoS. In such a case, the measurement message may include a CoS identifier or DSCP identifier associated with the particular service or CoS. In this way, endpoint device 210-1 may facilitate testing of multiple, different services or classes of service.

As further shown in FIG. 5, process 500 may include determining segment information that identifies the measurement message and a timestamp associated with the measurement message (block 520). For example, based on identifying the measurement message, network device 220 may determine segment information that identifies the measurement message and one or more timestamps associated with the measurement message.

In some implementations, the segment information may identify the measurement message. For example, the segment information may identify the measurement message based on a packet identifier or message identifier associated with the message, based on a time at which the measurement message was received, based on a device from which the measurement message was received, based on storing a copy of the measurement message, based on combining two or more attributes of the measurement message, based on a sequence identifier of the measurement message, based on a timestamp associated with the measurement message, based on a device identifier associated with the measurement message, or the like. In some implementations, the segment information may include information relating to the measurement message. For example, the segment information may include a timestamp identifying a time at which the measurement message was received by network device 220, a timestamp identifying a time at which the measurement information was transmitted by network device 220, and/or a size associated with the measurement message.

In some implementations, network device 220 may receive a measurement message on multiple, different occasions. For example, network device 220 may receive a measurement message en route from endpoint device 210-1 to endpoint device 210-2, and then may receive the measurement message en route from endpoint device 210-2 to endpoint device 210-1. In such a case, network device 220 may determine the segment information based on each of the multiple, different occasions. For example, network device 220 may determine a length of time in between each occasion (e.g., between the TWAMP message en route from endpoint device 210-1 to endpoint device 210-2 and the TWAMP message en route from endpoint device 210-2 to endpoint device 210-1). As another example, network device 220 may determine timestamps associated with each occasion on which network device 220 receives or transmits the measurement message, as described in connection with FIGS. 1A and 1B, above.

In some implementations, multiple, different network devices 220 may determine segment information for a measurement message. For example, each network device 220 may determine segment information for respective segments of the network associated with each network device 220. The multiple, different network devices 220 may provide the segment information to endpoint device 210 or network management device 230 to permit endpoint device 210 or network management device 230 to determine network performance information for each segment of a monitored path associated with the multiple, different network devices 220.

In this way, network devices 220 provide the segment information and conserve processor and network resources that would otherwise be used by endpoint device 210 to configure and perform multiple measurement processes. Additionally, performing measurements at each network device 220 based on a single test packet, measurement message, or network traffic flow provides more useful measurement information than performing such determinations based on multiple, different packets or network traffic flows.

As further shown in FIG. 5, process 500 may include storing or providing the segment information (block 530). For example, network device 220 may store or provide the segment information for identification of one or more network service incidents. In some implementations, network device 220 may provide information identifying the measurement message in association with the segment information, such as a message identifier associated with the measurement message, a copy of the measurement message, or the like.

In some implementations, network device 220 may provide the segment information periodically (e.g., once per hour, once per day, once per week, etc.), which may conserve network and/or processor resources that would otherwise be used to generate or process a request for the segment information. In some implementations, network device 220 may provide the segment information based on a request for the segment information, which may conserve network and/or processor resources that would otherwise be used for periodically providing unwanted segment information. For example, network management device 230 may request the segment information from one or more endpoint devices 210 and/or one or more network devices 220 associated with a monitored path. The segment information may permit network management device 230 to identify network service incidents, to determine an impact of a network service incident, to determine whether a service level agreement for a network service is satisfied, or the like.

In some implementations, network device 220 may provide the segment information as network device 220 receives the measurement message. For example, each network device 220 that receives a measurement message may provide the segment information to a particular device (e.g., endpoint device 210 or network management device 230) based on receiving the measurement message. In this way, network device 220 conserves local resources that would otherwise be used to store the segment information.

In some implementations, network device 220 may provide the segment information to endpoint device 210-1 or endpoint device 210-2. For example, endpoint device 210 may determine network performance information based on the segment information associated with the measurement message. In some implementations, endpoint device 210 may receive the segment information from two or more sets of network devices 220. For example, a measurement message may be associated with a first path that includes a first set of network devices 220, and may be associated with a second path that includes a second set of network devices 220 (i.e., that is different than the first path). Endpoint device 210 may receive the segment information from the first set of network devices 220 and the second set of network devices 220. For example, the first path and the second path may be redundant paths, or the first path may be an outbound path (e.g., a path to endpoint device 210-2) and the second path may be an inbound path (e.g., a path from endpoint device 210-2 to endpoint device 210-1) that is different than the outbound path. In this way, network performance information may be determined across multiple, different paths for a particular measurement message. Thus, network performance may be improved with regard to the multiple, different paths based on reconfiguring network devices 220 based on the network performance information.

In some implementations, endpoint device 210 (or network management device 230) may determine network performance information based on the segment information. For example, endpoint device 210 may use the segment information to identify a latency associated with a particular segment or hop. Additionally, or alternatively, endpoint device 210 may use the segment information to identify a change in latency over a time period. Additionally, or alternatively, endpoint device 210 may use the segment information to determine that a particular network device 220 or link is associated with a particular throughput or a change in throughput. For example, endpoint device 210 may identify a throughput based on a quantity of network traffic transmitted via the particular network device 220 or link, and based on timestamps associated with the particular network device 220 or link.

Additionally, or alternatively, endpoint device 210 may use the segment information to determine performance information with regard to a redundant path or failover path. For example, endpoint device 210 may measure performance and/or verify that link quality is maintained on the redundant path or failover path during a network failover.

Additionally, or alternatively, endpoint device 210 may determine network performance information for one or more services or classes of service. For example, endpoint device 210 may identify CoS identifiers or DSCP identifiers associated with the measurement messages, and may determine network performance information for services or classes of service identified by the CoS identifiers or DSCP identifiers. In some implementations, endpoint device 210 may provide network performance information that is segmented based on service, class of service, or the like. In some implementations, endpoint device 210 may identify a network service incident, may determine a service or class of service associated with the network service incident, and may provide information identifying the service or class of service.

In some implementations, endpoint device 210 or network management device 230 may perform an action or cause an action to be performed based on the segment information. For example, endpoint device 210 or network management device 230 may configure network device 220 to improve latency or throughput associated with network device 220. As another example, endpoint device 210 or network management device 230 may notify a technician of a network incident or may cause a technician to be dispatched to network device 220. As yet another example, endpoint device 210 or network management device 230 may cause additional measurement messages to be transmitted. As still another example, endpoint device 210 or network management device 230 may cause network traffic to be rerouted to a different path. As another example, endpoint device 210 or network management device 230 may cause one or more network devices 220 to be activated or deactivated. For example, if the monitored path is associated with a latency that satisfies a threshold, endpoint device 210 or network management device 230 may cause other network devices 220 to be activated (e.g., to improve load balancing of network traffic, to reduce stress on the network devices 220 of the monitored path, etc.). In this way, endpoint device 210 or network management device 230 may improve network performance based on segment information, which reduces network downtime, reduces packet loss and latency, and improves network throughput.

As further shown in FIG. 5, process 500 may include routing the measurement message toward the endpoint device (block 540). For example, network device 220 may route the measurement message toward endpoint device 210 or another device. In some implementations, network device 220 may route the measurement message via one or more other network devices 220. The one or more other network devices 220 may collect segment information regarding the measurement message, and may provide the segment information to endpoint device 210 or network management device 230. In this way, segment information for multiple network devices 220 along a monitored path is collected.

In some implementations, network device 220 may provide a modified measurement message. For example, network device 220 may add the segment information to the measurement message. In this way, network device 220 permits subsequent devices (e.g., endpoint device 210, other network devices 220, or network management device 230) to determine the segment information without transmitting a request for the segment information. This may conserve network resources of endpoint device 210, network device 220, or network management device 230 that would otherwise be used to transmit the request.

In some implementations, network device 220 may provide the measurement message without modifying the measurement message. In this way, processor and network resources of network device 220 are conserved that would otherwise be used to modify and provide the measurement message. Further, backward compatibility of the measurement message is improved (e.g., with regard to endpoint devices 210 that are not configured to receive or process segment information).

As described herein, implementations permit identification of segment information for each network device on a monitored path, and conserve processor and network resources that would otherwise be used to configure and perform multiple measurement processes. Additionally, implementations described herein perform measurements at each hop or segment of the monitored path based on a single packet or network traffic flow. Performing measurements at each hop or segment of the monitored path based on a single packet or network traffic flow provides more useful measurement information than performing such determinations based on multiple, different packets or network traffic flows.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
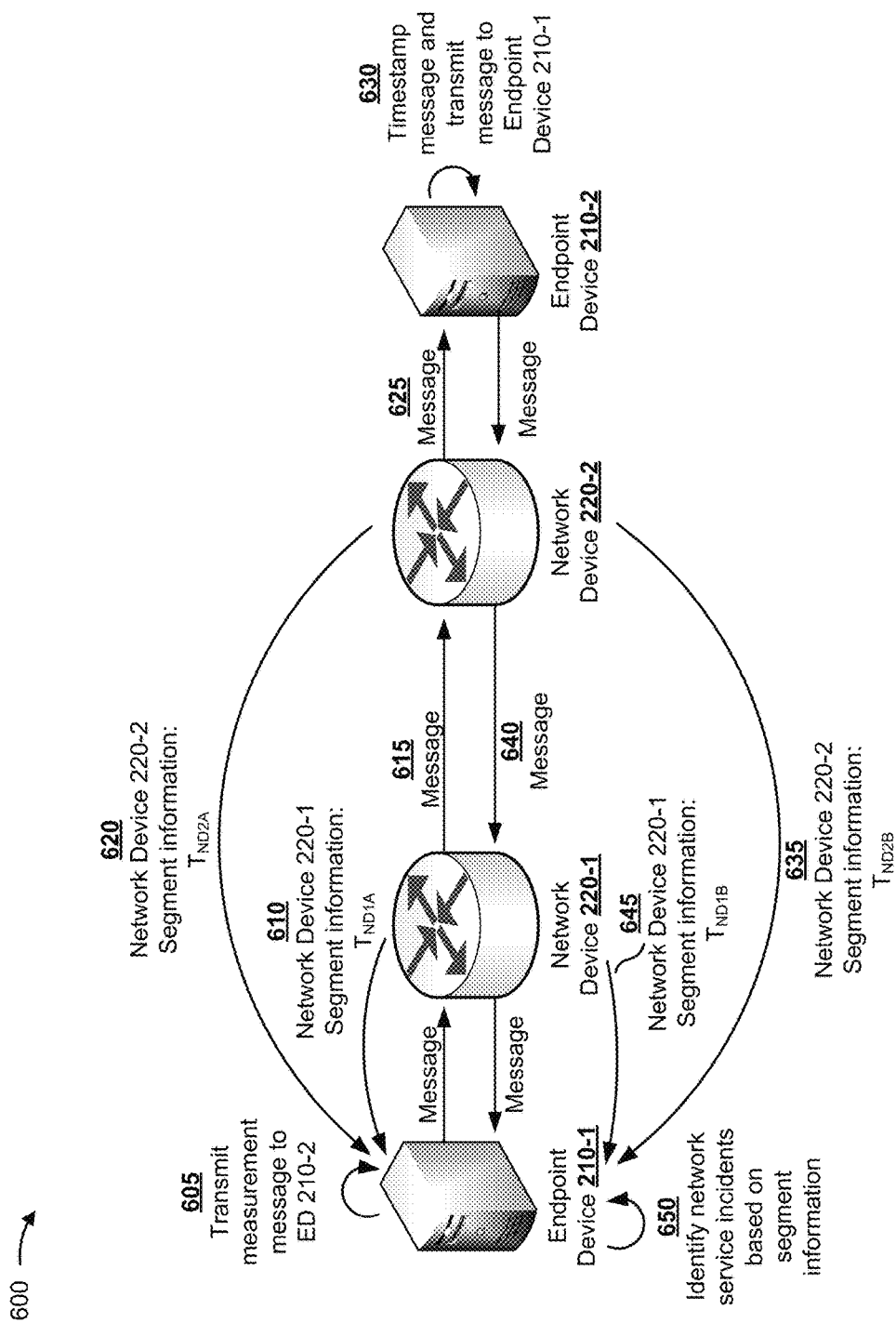
FIG. 6 is a diagram of an example implementation relating to the example process shown in FIG. 5.

FIG. 6 is a diagram of an example implementation 600 relating to example process 500 shown in FIG. 5. FIG. 6 shows an example process for determining segment information based on a measurement message. As shown in FIG. 6, example implementation 600 includes endpoint device 210-1, endpoint device 210-2, network device 220-1, and network device 220-2.

As shown by reference number 605, endpoint device 210-1 transmits a measurement message toward endpoint device 210-2. As further shown, network device 220-1 receives the measurement message transmitted by endpoint device 210-1. As shown by reference number 610, network device 220-1 then transmits segment information to endpoint device 210-1. The segment information may identify or include the measurement message, and may identify a time at which network device 220-1 received the measurement message and/or a time at which network device 220-1 transmitted the measurement message to network device 220-2 (e.g., $T_{ND1A}$).

As shown by reference number 615, network device 220-1 transmits the measurement message to network device 220-2. As further shown, network device 220-2 receives the measurement message from network device 220-1. As shown by reference number 620, based on receiving the measurement message, network device 220-2 transmits segment information to endpoint device 210-1 (e.g., $T_{ND2A}$).

The segment information may identify or include the measurement message, and may identify a time at which network device 220-2 received the measurement message and/or a time at which network device 220-2 transmitted the measurement message to endpoint device 210-2.

As shown by reference number 625, network device 220-2 transmits the measurement message received from network device 220-1 to endpoint device 210-2. Endpoint device 210-2 receives the measurement message from network device 220-2. As shown by reference number 630, endpoint device 210-2 timestamps the measurement message and transmits the measurement message to endpoint device 210-1. For example, endpoint device 210-1 may add, to the measurement message, information identifying a time at which endpoint device 210-2 received the measurement message and/or a time at which endpoint device 210 transmitted the measurement message toward network device 220-2.

As further shown, network device 220-2 receives the measurement message transmitted from endpoint device 210-2. As shown by reference number 635, based on receiving the measurement message, network device 220-2 transmits segment information to endpoint device 210-1 (e.g., $T_{ND2B}$). The segment information may identify or include the measurement message, and may identify a time at which network device 220-2 received the measurement message and/or a time at which network device 220-2 transmitted the measurement message to network device 220-1.

As shown by reference number 640, network device 220-2 transmits the measurement message to network device 220-1. As shown by reference number 645, based on receiving the measurement message, network device 220-1 transmits segment information for network device 220-1 (e.g., $T_{ND1B}$) to endpoint device 210-1. The segment information may identify or include the measurement message, and may identify a time at which network device 220-1 received the measurement message and/or a time at which network device 220-1 transmitted the measurement message to endpoint device 210-1.

As shown by reference number 650, endpoint device 210-1 receives the segment information from network device 220-1 and network device 220-2, and, based on the segment information, endpoint device 210-1 may perform an action or cause an action to be performed. In some implementations, the segment information may be provided to network management device 230, and network management device 230 may determine network performance information, perform an action, and/or cause an action to be performed based on the segment information.

As shown by example implementation 600, in some cases, each network device 220 may provide segment information to endpoint device 210-1 as each network device 220 receives the measurement message. In this way, local resources of network device 220 are conserved.

As indicated above, FIG. 6 is provided merely as an example. Other examples are possible and may differ from what was described with regard to FIG. 6.

Figure 7:
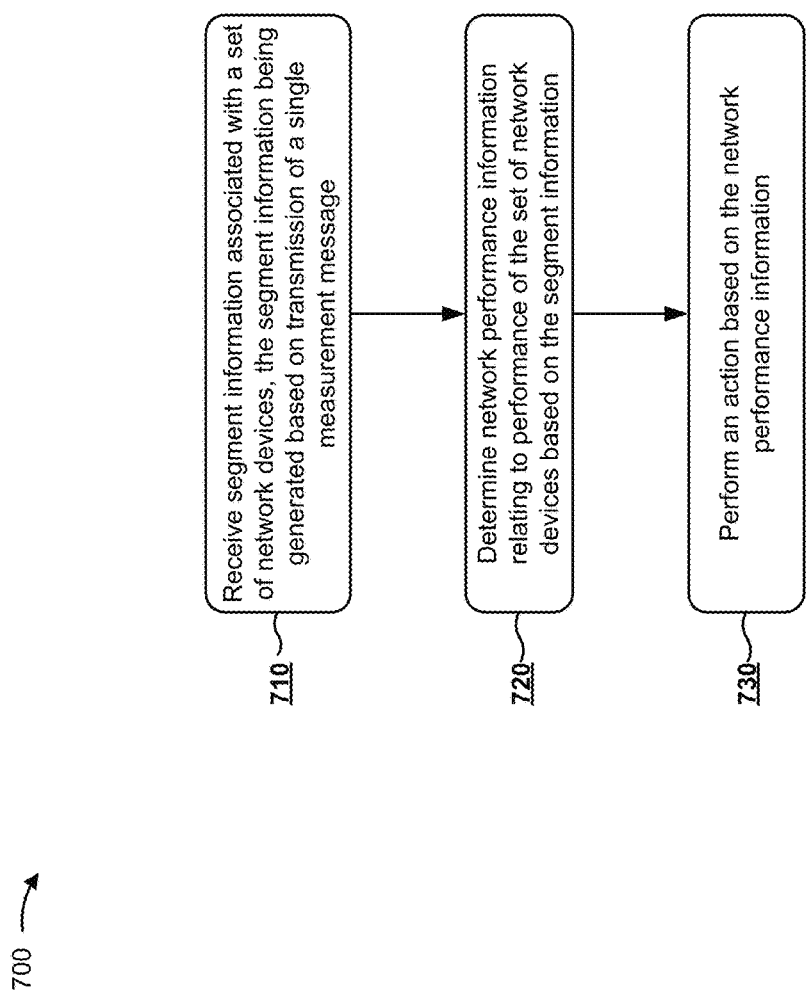
FIG. 7 is a flow chart of an example process for performing an action based on network performance information determined based on segment information associated with a set of network devices.

FIG. 7 is a flow chart of an example process 700 for performing an action based on network performance information determined based on segment information associated with a set of network devices. In some implementations, one or more process blocks of FIG. 7 may be performed by network management device 230. In some implementations, one or more process blocks of FIG. 7 may be performed by another device or a group of devices separate from or including network management device 230, such as endpoint device 210 and/or network device 220.

As shown in FIG. 7, process 700 may include receive segment information associated with a set of network devices, the segment information being generated based on transmission of a single measurement message (block 710). For example, network management device 230 may receive segment information associated with a set of network devices 220. The set of network devices 220 may be associated with a monitored path between endpoint device 210-1 and endpoint device 210-2. The segment information may identify one or more timestamps associated with each network device 220 of the set of network devices 220. For example, the segment information may identify a time at which network device 220 received a measurement message and/or a time at which network device 220 transmitted a measurement message (e.g., en route from endpoint device 210-1 to endpoint device 210-2 and/or en route from endpoint device 210-2 to endpoint device 210-1). Additionally, or alternatively, the segment information may identify sequence numbers associated with the measurement message, device identifiers associated with the network devices 220 and/or the measurement message, or the like.

In some implementations, network management device 230 may receive the segment information based on transmission of a single measurement message. For example, endpoint device 210-1 may transmit the single measurement message to endpoint device 210-2. Each network device 220 en route between endpoint device 210-1 and 210-2 may identify the single measurement message, and may transmit segment information to network management device 230 based on the single measurement message (e.g., as the single measurement message is received, periodically, based on a request from network management device 230, etc.). In some implementations, each network device 220 may receive the single measurement message after reflection from endpoint device 210-2, and may provide segment information based on receiving the single measurement message after reflection.

As further shown in FIG. 7, process 700 may include determining network performance information relating to performance of the set of network devices based on the segment information (block 720). For example, network management device 230 may determine network performance information relating to performance of the set of network devices 220 based on the segment information. The network performance information may identify latency, delay, jitter, throughput, loss, QoS measurements, or the like, relating to one or more of the set of network devices 220. Additionally, or alternatively, the network performance information may identify a network outage, a network service incident, or the like. Additionally, or alternatively, the network performance information may indicate that a Quality of Service (QoS) requirement has been violated based on a latency, delay, jitter, throughput, or the like.

Network management device 230 may determine the network performance information based on timestamps identified by the segment information associated with each network device 220. For example, network management device 230 may compare timestamps associated with adjacent network devices 220 to identify a latency associated with a link or hop between the adjacent network devices 220. As another example, network management device 230 may compare a timestamp associated with reception of the measurement message by network device 220, to a timestamp associated with transmission of the measurement message by network device 220, to determine a latency or delay associated with network device 220.

As further shown in FIG. 7, process 700 may include performing an action based on the network performance information (block 730). For example, endpoint device 210 or network management device 230 may perform an action or cause an action to be performed based on the network performance information. For example, endpoint device 210 may configure network device 220 to improve latency or throughput associated with network device 220. As another example, endpoint device 210 may notify a technician of a network incident or may cause a technician to be dispatched to network device 220. As yet another example, endpoint device 210 may cause additional measurement messages to be transmitted. As still another example, endpoint device 210 may cause network traffic to be rerouted to a different path.

As another example, endpoint device 210 may cause one or more network devices 220 to be activated or deactivated. For example, if the monitored path is associated with a latency that satisfies a threshold, endpoint device 210 may cause other network devices 220 to be activated (e.g., to improve load balancing of network traffic, to reduce stress on the network devices 220 of the monitored path, etc.). In this way, endpoint device 210 or network management device 230 may improve network performance based on segment information, which reduces network downtime, reduces packet loss and latency, and improves network throughput.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As described herein, implementations permit identification of segment information for each network device 220 on a monitored path, and conserve processor and network resources that would otherwise be used to configure and perform multiple measurement processes corresponding to each network device 220 or segment. Additionally, implementations described herein perform measurements at each hop or segment of the monitored path based on a single packet or network traffic flow. Performing measurements at each hop or segment of the monitored path based on a single packet or network traffic flow provides more useful measurement information than performing such determinations based on multiple, different packets or network traffic flows.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device for determining information for a network, the network device comprising:
one or more processors configured to:
receive a measurement message en route from a source endpoint device to a destination endpoint device via the network,
where the measurement message includes a test packet of a two-way active measurement protocol (TWAMP) session between the source endpoint device and the destination endpoint device;
determine the information based on the measurement message,
the information including a timestamp identifying a time associated with the measurement message, and
the information identifying the measurement message;
provide, to the source endpoint device and in a separate message than the measurement message, the information for determination of network performance information regarding the network device; and
transmit the measurement message toward the destination endpoint device,
wherein the information is provided to the source endpoint device as the measurement message is transmitted toward the destination endpoint device.

2. The network device of claim 1, where the one or more processors, when providing the information, are configured to:
provide the information in association with a copy of the measurement message.

3. The network device of claim 1, where the network device is one of a plurality of network devices,
each network device, of the plurality of network devices, to receive the measurement message, and each network device, of the plurality of network devices, to determine corresponding information based on the measurement message,
the corresponding information for each network device identifying a respective time at which each network device received or transmitted the measurement message.

4. The network device of claim 1, where the information includes one or more of:
a device identifier associated with the network device, or
a class of service identifier.

5. The network device of claim 1, where the measurement message is one of a plurality of measurement messages; and
where the information identifies a respective plurality of sequence numbers or continuity counters corresponding to the plurality of measurement messages.

6. The network device of claim 1, where the time associated with the measurement message includes one or more of:
a time at which the measurement message was received by the network device, or
a time at which the measurement message was transmitted toward the destination endpoint device by the network device.

7. A non-transitory computer-readable medium storing instructions, the instructions comprising:
one or more instructions that, when executed by one or more processors of a device, cause the one or more processors to:
receive a measurement message from a source endpoint device en route to a destination endpoint device,
the measurement message including a test packet of a two-way active measurement protocol (TWAMP) session between the source endpoint device and the destination endpoint device;
determine segment information based on receiving the measurement message,
the segment information including a timestamp associated with the measurement message,
the timestamp to identify a time at which the measurement message is received or transmitted by the device, and
the segment information identifying the measurement message;
provide, to the source endpoint device and in a separate message than the measurement message, the segment information for determination of network performance information regarding the device; and
transmit the measurement message toward the destination endpoint device,
wherein the information is provided to the source endpoint device as the measurement message is transmitted toward the destination endpoint device.

8. The non-transitory computer-readable medium of claim 7, where the one or more instructions, that cause the one or more processors to determine the segment information, cause the one or more processors to:
determine a first timestamp and a second timestamp,
the first timestamp identifying a first time at which the device received the measurement message, and
the second timestamp identifying a second time at which the device transmitted the measurement message toward the destination endpoint device.

9. The non-transitory computer-readable medium of claim 7, where the device is a network device; and where the one or more instructions, that cause the one or more processors to receive the measurement message, cause the one or more processors to:
receive the measurement message en route from a first network device to a second network device associated with the destination endpoint device,
the measurement message being received at a first time; and
where the one or more instructions, when executed by the one or more processors, further cause the one or more processors to:
receive the measurement message at a second time,
the measurement message being received en route from the second network device to the first network device.

10. The non-transitory computer-readable medium of claim 9, where the one or more instructions, that cause the one or more processors to determine the segment information, cause the one or more processors to:
store or provide information identifying the first time and the second time.

11. The non-transitory computer-readable medium of claim 7, where the device is a network device,
the network device being one of a plurality of network devices; and
where the one or more instructions, that cause the one or more processors to provide the segment information, cause the one or more processors to:
provide the segment information to a particular network device,
the particular network device to receive segment information corresponding to each network device of the plurality of network devices, and
the particular network device to determine the network performance information based on the segment information corresponding to each network device.

12. The non-transitory computer-readable medium of claim 7, where the one or more instructions, that cause the one or more processors to provide the segment information, cause the one or more processors to:
provide the segment information in association with a copy of the measurement message.

13. A method for configuring a network, the method comprising:
receiving, by a first endpoint device, segment information associated with a plurality of network devices,
the segment information being generated based on transmission of a single measurement message received by each network device of the plurality of network devices,
the single measurement message including a test packet of a two-way active measurement protocol (TWAMP) session between the first endpoint device and a second endpoint device,
the segment information being received in a separate message than the single measurement message, and
the segment information identifying times at which each network device received or transmitted the single measurement message, and
at least one network device, of the plurality of network devices, not being the first endpoint device or the second endpoint device;

determining, by the first endpoint device, network performance information relating to performance of the plurality of network devices based on the segment information; and performing, by the first endpoint device, an action based on the network performance information.

14. The method of claim 13, where receiving the segment information comprises:

receiving a copy of the single measurement message from each of the plurality of network devices.

15. The method of claim 13, where the single measurement message originates from the first endpoint device and is en route to the second endpoint device, the plurality of network devices being associated with a path between the first endpoint device and the second endpoint device.

16. The method of claim 13, where receiving the segment information further comprises:

receiving segment information corresponding to a particular network device, of the plurality of network devices, based on the particular network device receiving the single measurement message, the segment information to be provided by the particular network device as the single measurement message is received by the particular network device.

17. The method of claim 13, where the single measurement message is one of a plurality of measurement messages; and where receiving the segment information comprises:

receiving a plurality of segment information corresponding to the plurality of measurement messages, the plurality of segment information including a respective plurality of sequence numbers corresponding to the plurality of measurement messages; and where determining the network performance information comprises:

determining one or more of:
a packet loss value,
a frame loss value,
a packet delay variation, or
a frame delay variation,
the network performance information being determined based on differences in times associated with the plurality of measurement messages.

18. The method of claim 13, where receiving the segment information comprises:

receiving the segment information based on transmitting one or more requests for the segment information to the plurality of network devices.

19. The method of claim 13, where performing the action includes:

causing, based on the network performance information, network traffic to be rerouted.

20. The method of claim 13, where performing the action includes:

causing, based on the network performance information, one or more network devices, of the plurality of network devices, to be activated or deactivated.

* * * * *